Dec. 25, 1951     V. E. GLEASMAN     2,579,664
SCALE
Filed Dec. 6, 1945
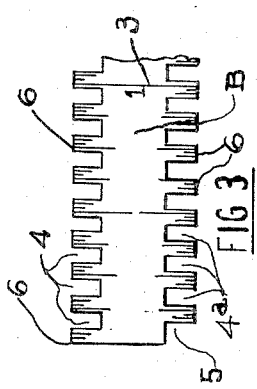
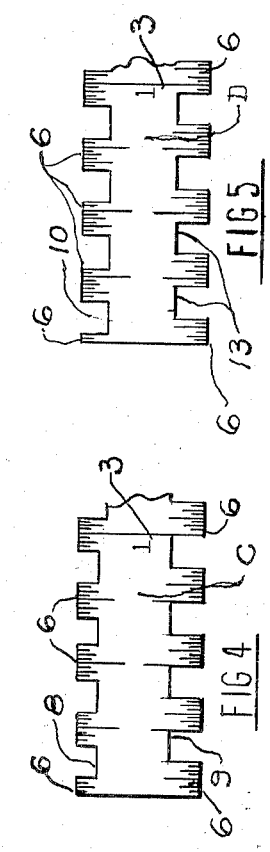
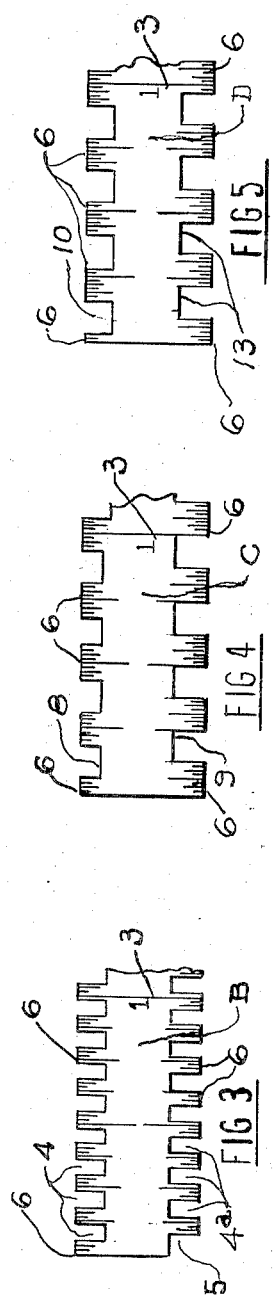
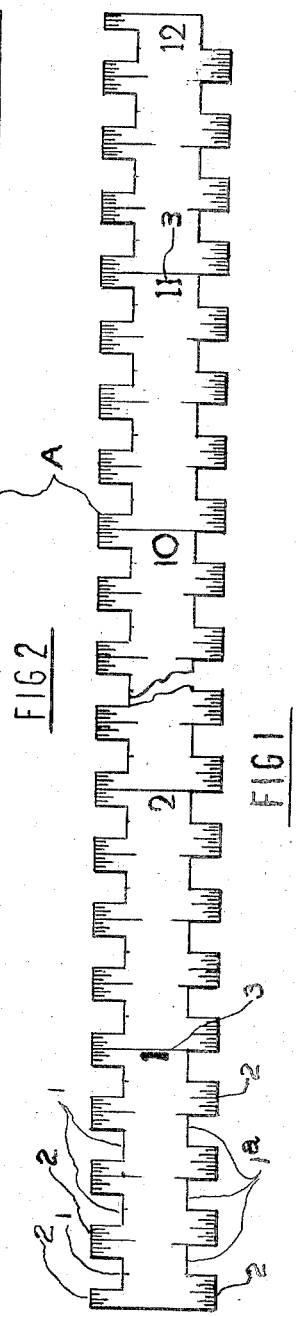
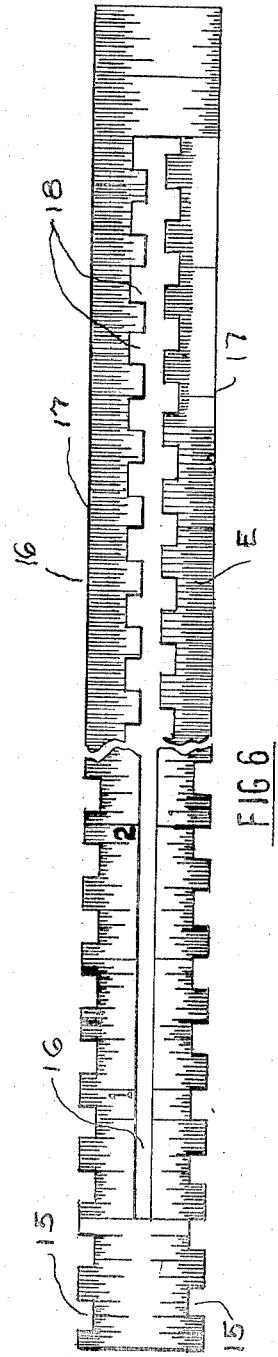
INVENTOR
VERNON E GLEASMAN
BY
ATTORNEYS Patented Dec. 25, 1951

2,579,664

UNITED STATES PATENT OFFICE 2,579,664

SCALE

Vernon E. Gleasman, Elmira, N. Y.

Application December 6, 1945, Serial No. 633,212

7 Claims. (Cl. 33—107)

This invention is a novel and unique scale, principally designed for use in measuring, spacing, or laying out specified lines for different purposes; also for similarly measuring or the like very close dimensions using a sharp pencil point or scriber; also for setting height gages, surface gages, and measuring depths of holes; also for measuring standard thicknesses of seals, washers, collars, lugs, shoulders and other extensions of metals or fabrics, by using notches as a snap gage.

My invention is a novel and unique scale principally designed for the purpose of measuring, spacing, or laying out lines or marks to a predetermined distance, or a given distance, to be scribed, scratched or marked by a scriber, pencil or a sharp pointed marker, on a tin template, iron, steel or any other hard surface; said scale to be also used as a snap gage, thickness gage, depth gage, width or length gage.

Another object is to provide a scale of the above type which may be placed flat on the metal or other surface, with the end of the scale disposed either at the end of the template or at a predetermined starting mark thereon followed by the user making a scratch close to the edge of one of the notches, bearing down on to the template, leaving the desired markings. If another dimension is required to be marked or laid out further along the scale the scriber is placed against another notch of the scale, and hence when the scale is removed from the template the layout of two marks is obtained, which are accurately placed or drawn at the predetermined distance required. If a standard scale is used and the scriber placed at the same distance along the scale the marks on the template would customarily be inaccurate and out of place or dimension because of the necessity of the user having to sight the marks or graduations.

Another method of using the scale is to place same on the template parallel with the center line thereof, with one of the outer edges of the scale touching the center line. This allows the line scribed by the notches to start from the center line in, or from the inside of the notches to the center line.

A further object of my invention is to provide a scale with graduated notches, grooves, steps, slots or progressive spacing on the outer edge of the scale, and also throughout a slot at the center of the scale.

Other minor objects of the invention will be hereinafter set forth.

I will explain the invention with reference to the accompanying drawing, which illustrates several practical embodiments thereof, to enable others familiar with the art to adopt and use the same; and will summarize in the claims, the novel features of construction, and novel combinations of parts, for which protection is desired.

In said drawings:

Figure 1 is a top plan view of one form of scale provided with notches on its outer edges, at predetermined desired intervals.

Fig. 2 is a side elevation of the scale shown in Fig. 1.

Fig. 3 is a top plan view of one end of a modified scale showing a different arrangement of notches along the outer edges of the scale.

Fig. 4 is a top plan view of one end of a further modified scale illustrating a different location of notches, the notches on one edge being shallower than the notches on the other.

Fig. 5 is a top plan view of one end of a still further modified scale showing a still different arrangement of notches; and Fig. 6 is a top plan view of one end of a still further modified scale showing the use of notches on both outer edges thereof for approximately half the length of the scale, and showing a straight-sided slot coextensive with the notched end of the scale, the outer edges of the scale being straight throughout the remainder of the length thereof and coextensive notches being provided in the remainder of the central slot.

As shown, my novel graduated scale is preferably blanked and comprises a long and narrow strip or strap of steel or fabric which may be formed to different sizes and lengths, and used for measuring, spacing, and laying out work as hereinafter described. Said scale may be made of lengths such as 6", 9", 12", 18", 34" and 36", or in fact may be of any desired length; and said scale may be made in 3/8", 1/2", 5/8" and 3/4" widths, or any other desired widths, and may be made in 1/15", 1/8" and 1/16" thicknesses or any other desired thicknesses.

In Figures 1 and 2 the scale A, as illustrated, is provided with notches I on one outer side starting 1/16" from one end of the scale and said notches I are spaced 1/8" apart throughout the length of the scale; also provided with notches Ia at the other outer side of the scale, notches Ia being spaced 1/8" apart through the said length of the scale, but starting 1/8" from the same end of the scale.

The outer edges of the scale between the notches I, Ia carry graduations 2, as shown, preferably but not necessarily, in 64ths of an inch; and the scale A also carries the customary inch or other graduations 3 conveniently extending fully across the scale from one side to the other, the smaller graduations 2 being of respective smaller lengths to facilitate reading thereof.

In Fig. 3 the scale B is provided with notches 4 on one side starting 1/16" from one end of the scale, said notches being 1/16" wide and spaced 1/16" apart; and is also provided with notches 4a on the other side, starting with 5/64" from the same end of the scale, said notches 4a also being spaced 1/16" apart and being 1/16" wide, leaving a cutout 5 at the said end of the scale. The sides of the scale between the notches carry graduations 6, preferably in one sixty-fourths of an inch and scale B is likewise provided with the inch graduations 3, as in Figure 2 extending entirely across the scale from side to side.

In Figure 4 the scale C is similar to the scales A and B but the notches 8 on one side of the scale are shallower than the notches 9 at the other side thereof, the notches 8 and 9 being 1/8" wide and spaced 1/8" apart. In this modification the notches 8 commence 1/16" from one end of the scale, while the notches 9 commence 1/8" from the same end of the scale.

In Figure 5 the scale D is provided with notches 10 in one outer edge which are 1/8" wide and are spaced 1/8" apart, the notches 10 starting 3/32" from one end of the scale D; also provided with notches 13 in the opposite outer edge of the scale commencing 3/32" from the same end of the scale said notches 13 being 1/8" wide and spaced 1/8" apart throughout the length of the scale. As in Figures 3 and 4, the outer ends of the notches are provided with graduations 6 in sixty-fourths of an inch.

In Figure 6 a further modified scale E is illustrated, same being provided with notches 15 in the outer side edges thereof, and further provided with a slot 16 disposed centrally and axially of the scale. The notches 15 extend for approximately one-half the length of the scale, and the side edges of the remaining portion of the scale indicated at 17 being unnotched; while the sides of the slot 16 coextensive with the straight-edged portion 17 of the scale are notched as at 18. The scale E is provided with graduations such as 6 throughout the length thereof at the side edges, and coextensive with the slotted portion 16.

The above scales, arranged as set forth, provide for accurate measuring, the same being notched to suit the desired needs in measuring various different shapes, dimensions, steps, depths, in or on or over the work; also a scale so designed that close marking, scribing and drawing of lines can be made without guesswork; also a scale which will give an exact measuring of finished depths, widths, lengths and thicknesses of work; also a scale for determining the measuring of overlapping parts of pieces of work, and for use as a snap gage for measuring different standard thicknesses and angles of shoulders, flanges, projections and other extensions in various articles.

My scale may be provided with notches on both sides, starting from different distances from an end of the scale, the notches being spaced equally or unequally along the edges; or with the notches starting from different points from a corner of the scale and extending along the edges of the scale.

I do not limit my invention to the exact forms shown in the drawings, for obviously changes may be made therein within the scope of the claims.

I claim:

1. A layout scale, comprising a strip having generally parallel side edges with graduation markings extending thereacross; said side edges having series of evenly spaced notches therein respectively, having opposed transverse edges disposed perpendicularly to the longitudinal axis of the scale along which a scriber may be drawn, said notches extending from the same end of the scale and terminating at substantially the center of the length of the scale, the remaining portions of the side edges being continuously straight edged; and said scale having an axially disposed slot extending therein parallel with the side edges of the scale.

2. In a scale as a set forth in claim 1, the sides of the slot coextensive with the notched side edge portion of the scale being continuously straight edged; and the sides of the slot coextensive with the straight-edged portion of the scale being notched.

3. In a scale as set forth in claim 1, the series of notches starting at different graduations respectively from the same end of the scale.

4. A layout scale, comprising a base strip having generally parallel side edges with graduation markings extending thereacross; said side edges having series of evenly spaced notches therein respectively, having opposed transverse edges disposed perpendicularly to the longitudinal axis of the scale along which a scriber may be drawn, the notches of each series being of same width, the said series of notches extending from the same end of the scale and terminating at substantially the center of the length of the scale, the remaining portions of the side edges being continuously straight edged; and said scale having an axially disposed slot extending therein parallel with the side edges of the scale.

5. In a scale as set forth in claim 4, the sides of the slot coextensive with the notched side edge portion of the scale being continuously straight edged; and the sides of the slot coextensive with the straight edge portion of the scale being notched.

6. In a scale as set forth in claim 4, the series of notches starting at different graduations respectively from the same end of the scale.

7. A layout scale, comprising a base strip having generally parallel side edges with graduation markings extending thereacross; said side edges having series of evenly spaced notches therein respectively, having opposed transverse edges disposed perpendicularly to the longitudinal axis of the scale along which a scriber may be drawn, the notches of each series being of same width, the said series of notches extending from the same end of the scale and terminating at substantially the mid-point of the length of the scale, the remaining portions of the side edges being continuously straight edged; said scale having an axially disposed slot extending therein parallel with the side edges of the scale, the sides of the slot coextensive with the notched side edge portion of the scale being continuously straight edged; and the sides of the slot coextensive with the straight edge portion of the scale being notched; and the series of notches in the side edges and slot starting at different graduations respectively from the same end of the scale.

VERNON E. GLEASMAN.

(References on following page)

REFERENCES CITED

The following references are of record in the file of this patent:

UNITED STATES PATENTS

| Number | Name | Date |
|---|---|---|
| D. 136,395 | Deckman | Sept. 21, 1943 |
| 569,358 | Sammerfeldt | Oct. 13, 1896 |
| 854,351 | Hight | May 21, 1907 |
| 960,196 | Powell | May 31, 1910 |
| 965,945 | Roman | Aug. 2, 1910 |
| 999,730 | Allen | Aug. 8, 1911 |
| 1,293,313 | Berkoff | Feb. 4, 1919 |
| 1,352,270 | Jefferson | Sept. 7, 1920 |
| 1,686,980 | Nuchols | Oct. 9, 1928 |
| 1,877,341 | Kurtz | Sept. 13, 1932 |
| 2,245,313 | Wilhite | June 10, 1941 |

FOREIGN PATENTS

| Number | Country | Date |
|---|---|---|
| 753,009 | France | July 31, 1933 |